United States Patent [19]

Hughes

[11] Patent Number: 4,674,222
[45] Date of Patent: Jun. 23, 1987

[54] FISHING ROD HOLDER

[76] Inventor: Thomas M. Hughes, 310 Cardinal Dr., Taylors, S.C. 29687

[21] Appl. No.: 815,748

[22] Filed: Dec. 31, 1985

Related U.S. Application Data

[63] Continuation of Ser. No. 577,002, Feb. 6, 1984, abandoned.

[51] Int. Cl.⁴ ............................................. A01K 97/00
[52] U.S. Cl. ....................................................... 43/21.2
[58] Field of Search .................. 43/21.2; 248/511, 519, 248/528, 529, 534

[56] References Cited

U.S. PATENT DOCUMENTS

| | | | |
|---|---|---|---|
| 965,826 | 7/1910 | Lynch | 43/21.2 |
| 1,192,112 | 7/1916 | Porter | 43/21.2 |
| 3,033,503 | 5/1962 | Wenderski | 43/21.2 |
| 3,327,978 | 6/1967 | Gates | 43/21.2 |
| 3,564,753 | 2/1971 | Fravel | 43/21.2 |
| 3,835,568 | 9/1974 | Whitfield | 43/21.2 |
| 4,261,128 | 4/1981 | Dobbins | 43/21.2 |

Primary Examiner—Kurt Rowan
Attorney, Agent, or Firm—Julian W. Dority

[57] ABSTRACT

A fishing rod holder for mounting on the inside wall of the gunwale of a boat. The holder includes a bracket which pivotably secures a ring that is used for extending over the handle of the rod for holding the rod in an inclined position over the side of the boat. A pair of vertically extending bores are provided in the bracket for receiving a pair of vertically extending laterally spaced legs forming part of a restrictive member. Outwardly projecting arms are integral with the upper ends of the laterally spaced legs which are joined by a U-shaped member. The legs are vertically adjustable within said bores for positioning a base portion of the U-shaped member a predetermined distance below the rod handle. The outwardly projecting arms of the restricting member prevent the rod from rotating in the holder responsive to a fish striking. The rod is permitted to be raised directly upwardly from the holder when a fish strikes so as to set the hook. When not in use, the rod holder can be readily disassembled and placed in a tackle box.

2 Claims, 3 Drawing Figures

FISHING ROD HOLDER

This is a continuation of application Ser. No. 577,002 filed Feb. 6, 1984 which was abandoned upon the filing hereof.

BACKGROUND OF THE INVENTION

Many rod holders have been developed for installing on the gunwale of boats and the like but normally, they are cumbersome and relatively large in size. It is important when mounting a fishing rod on a boat for trolling and still fishing, that the rod be mounted so that when a strike occurs, the rod can be lifted directly upward from the rod holder for setting the hook in the fish's mouth. Examples of rod holders presently utilized are disclosed in U.S. Pat. No. 2,178,655, 2,734,205 and 3,095,663. In an attempt to produce a rod holder wherein the rod can be readily mounted on the gunwale of a boat, rings have been provided for slipping over the handle of the rod. One problem of just using a simple ring for slipping over the handle of the rod is that when the holder was being used for trolling for fish and a strike occurred behind the boat, the rod would tilt rearwardly in the holder and possibly slide out of the ring.

Another problem with rod holders heretofore utilized is that they form obstructions in the boat and when not in use, they remain mounted on the boat. When the boat was used for pleasure as well as for fishing, these obstructions became hazardous to the occupants of the boat.

SUMMARY OF THE INVENTION

The rod holder constructed in accordance with the present invention can be mounted on an inside wall of the gunwale of a boat. The rod holder includes a bracket which is attached by any suitable means such as screws to the inside wall. A pivotally secured ring is carried by the bracket and extends over a handle of the rod for holding the rod in an inclined position over the side of the boat. A pair of vertically extending spaced bores is provided in the bracket. A restricting member is inserted within these bores. The restricting member includes a pair of vertically extending laterally spaced legs, each of which extends into a respective vertically extending bore provided in the bracket. Outwardly projecting arms are integral with the upper ends of the laterally spaced legs, and a U-shaped member joins the outer ends of the outwardly projecting arms so that when the handle of the rod is inserted in the ring and extends between the outwardly projecting arms of the restricting member, the arms restrict forward and rearward turning of the rod towards the front and rear of the boat for preventing the rod from becoming dislodged from the holder when a fish strikes, tending to pull the rod rearwardly or forwardly of the boat.

The bracket has an inclined surface thereon upon which the rod handle rests for maintaining the rod at a predetermined inclination. The restricting member in one particular embodiment, is constructed of an integral one-piece member formed out of a metal rod. The pair of vertically extending laterally spaced legs are spaced apart slightly greater than the spacing between the spaced bores so that when the legs are inserted in the bores they are placed in compression snugly securing the restricting member in the bracket while permitting ready removal therefrom.

Accordingly, it is an important object of the present invention to provide a rod holder that includes a bracket that can be readily mounted on an inside wall of a gunwale of a boat while permitting the remainder of the structure to be readily removed and placed in a tackle box or the like.

Another important object of the present invention is to provide a rod holder wherein a fishing rod can be readily inserted therein and upon the occurence of a strike the rod can be readily lifted out of the holder for setting the hook in the the fish.

Another important object of the present invention is to provide a rod holder which includes a restricting member which prevents the rod from rotating so that it cannot accidentally become dislodged from the rod holder.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

DESCRIPTION OF A PREFERRED EMBODIMENT

Figure 1:
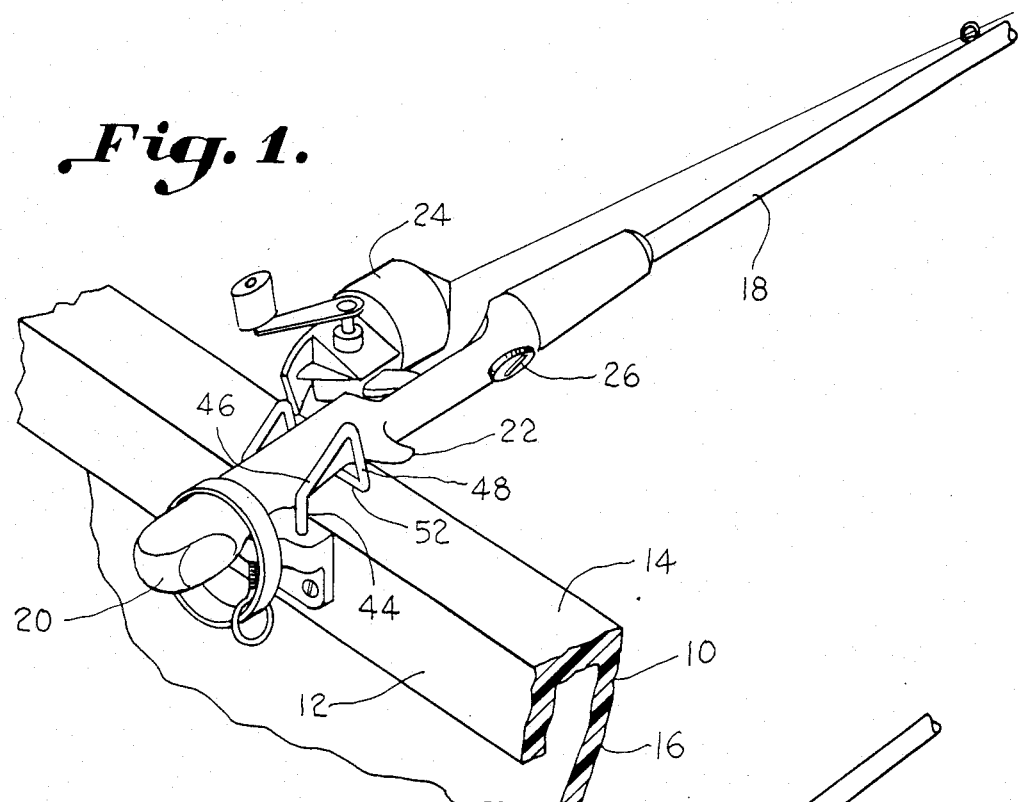
FIG. 1 is a perspective view illustrating the rod holder supported on the gunwale of a boat.

Referring to FIG. 1 of the drawings, there is illustrated the gunwale of a boat which has an inside wall 12 joined by a top surface 14 and outer wall 16. The rod holder constructed in accordance with the present invention is provided for supporting a conventional fishing rod which includes an elongated rod portion 18 and a handle 20. On this particular rod, there is a finger grip in the form of a trigger 22. A conventional reel 24 is secured to the handle in the conventional manner through the use of the screw mechanism 26.

Figures 2, 3:
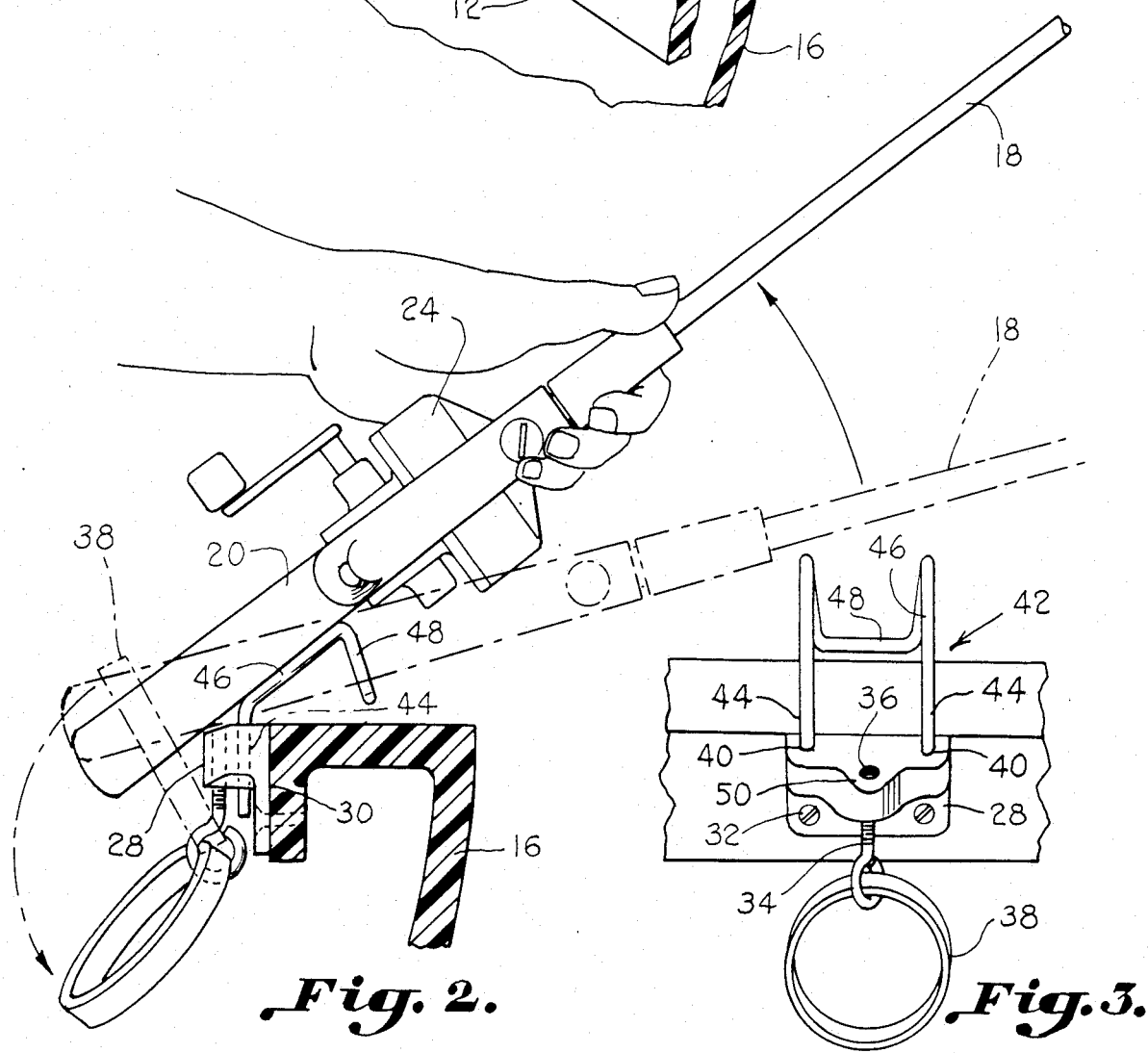
FIG. 2 is a side elevational view illustrating the manner in which the rod is removed from the holder.
FIG. 3 is an enlarged elevational view of the rod holder.

It is important when trolling or still fishing that the rod be held at a predetermined angle such as shown in phantom lines in FIG. 2. When a fish strikes the rod, in order to set the hook it is desirable that the rod be lifted from the rod holder with the tip end of the rod being able to be raised directly upwardly. The rod holder constructed in accordance with the present invention includes a bracket 28 that has a flat rear surface 30 that rests flush against the inside wall of the gunwale. The bracket is secured to the inside wall by means of threaded screws 32. An eye-bolt 34 is threadably secured within a threaded bore 36 extending vertically through an outwardly protruding porion of the bracket. A plastic ring 38 is threaded through the eye of the eye-bolt 34. It is noted that the eye has a diameter larger than the thickness of the ring so that the ring is pivotably mounted within the eye.

The bracket also has a pair of vertically extending spaced bores 40 provided therein. A rod restricting member 42 is carried within the bores 40. The rod restricting member is constructed in one integral piece from a metal rod. The restricting member includes a pair of vertically extending laterally spaced legs 44 which fit down into the laterally spaced bores 40. Outwardly projecting arms 46 are integral with the upper ends of the laterally spaced legs and prevent rotation of the handle 20 within the rod restricting member 42. A U-shaped member 48 is integral with and joins the outer ends of the outwardly projecting arms.

There is an inclined surface 50 carried on the upper surface of the bracket upon which the rod handle rests when secured in the holder for holding the rod at a predetermined inclination. When it is desired to mount the rod in the holder, first the eye-bolt 34 is adjusted by rotating so that the ring 38 can pivot to the up position such as shown in FIG. 1, to extend over the rear end of the handle and hold the rod at the desired inclination. The handle of the rod fits in the space provided between the spaced projecting arms with the trigger 22 on the handle being positioned slightly out beyond the U-shaped portion 48. The rod positioning member is inserted within the laterally spaced bores 40 and since the legs 44 are under compression, the height that the horizontal lower portion of the U-shaped member is positioned below the rod handle can be readily adjusted. In operation, it is desired that the lower horizontal connecting rod portion 52 of the U-shaped member be spaced out of contact with the handle so that the rod is supported on the inclined surface 50 and by the ring 38 engaging the upper surface of the handle. When a fish strikes and pulls the rod downwardly, the rod sometimes engages the horizontal portion 52 preventing the reel from striking the upper surface 14 of the gunwale and being damaged. If the rod is positioned for trolling and extends directly outwardly from the side of the boat and a fish strikes, such will tend to rotate the rod rearwardly. The rod is prevented from rotating rearwardly by the restricting member which includes the legs 44, the outwardly projecting arms 46 and the U-shaped member 48.

When the rod holder is not in use, it can be readily removed from the bracket 28. The restricting member generally designated by the reference character 42, is squeezed together and slipped out of the bores 40. The eye-bolt is unscrewed from the threaded bore 36 and both the restricting member 42 and the ring and eye-bolt 34 and 38, respectively, are removed and placed in a tackle box out of the way. The only thing that remains on the boat is the bracket 28 which has smooth surfaces that do not present a hazard to occupants of the boat.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. A fishing rod holder for mounting on an inside wall of a gunwale of a boat for supporting a fishing rod in an inclinded fishing position, said rod holder including a bracket attached to said inside wall, a pivotally secured ring carried by said bracked extending over a handle of said rod holding said rod in an inclined position over the side of said boat, and a reel carried on an intermediate portion of said handle, the improvement comprising:
   an inclined surface opposite where said ring extends over said rod handle, on an upper surface of said bracket upon which said rod handle rests which cooperates with said ring for maintaining said rod at a predetermined inclination;
   a pair of vertically extending spaced bores provided in said bracket;
   a one piece restricting member readily insertable into and removable from said spaced bores, said restricting member including:
   (i) a pair of vertically extending laterally spaced legs each of which extends into a respective vertically extending bore provided in said bracket,
   (ii) outwardly projecting arms integral with the upper ends of said laterally spaced legs for engaging said handle below said reel to prevent rotation of said handle within said one piece restricting member, and
   (iii) a U-shaped member joining the outer ends of said outwardly projecting arms with a base portion positioned a predetermined distance below said rod handle when said rod is inserted in said rod holder for limiting the downward movement of said rod when a fish strikes,
   so that when said handle of said rod is inserted in said ring and extends between said outwardly projecting arms of said restricting member, said arms restrict forward and rearward turning of said rod toward the front and rear of said boat,
   said restricting member being formed out of a metal rod, and
   said pair of vertically extending laterally spaced legs being spaced apart slightly greater than the spacing between said spaced bores so that when said legs are inserted in said bores, they are in compression snugly securing said restricting member in said bracket while permitting vertical adjustment in said bores and ready removal therefrom.

2. A fishing rod holder for mounting on an inside wall of a gunwale of a boat for supporting a fishing rod in an inclined fishing position, said rod holder including a bracket attached to said inside wall, a pivotally secured ring carried by said bracket extending over a handle of said rod holding said rod in an inclined position over the side of said boat, and a reel carried on an intermediate portion of said handle, the improvement comprising:
   a pair of vertically extending spaced bores provided in said bracket;
   a one piece restricting member readily insertable into and removable from said spaced bores, said restricting member including:
   (i) a pair of vertically extending laterally spaced legs each of which extends into a respective vertically extending bore provided in said bracket,
   (ii) upwardly and outwardly inclined projecting arms integral with the upper ends of said laterally spaced legs for engaging said handle below said reel to prevent rotation of said handle within said one piece restricting member, and
   (iii) a U-shaped member joining the outer ends of said outwardly projecting arms with a base portion being spaced from and positioned a predetermined distance below said rod handle when said rod is inserted in said rod holder,
   so that when said handle of said rod is inserted in said ring and extends between said outwardly projecting arms of said restricting member, said arms restrict forward and rearward turning of said rod toward the front and rear of said boat, said U- shaped member extending downwardly from said outer ends of said outwardly projecting arms,
said pair of vertically extending laterally spaced legs being spaced apart slightly greater than the spacing between said spaced bores so that when said legs are inserted in said bores, they air in compression snugly securing said restricting member in said bracket while permitting ready removal therefrom.

* * * * *